US 8,428,356 B2

(12) United States Patent
Enomoto

(10) Patent No.: US 8,428,356 B2
(45) Date of Patent: Apr. 23, 2013

(54) IMAGE PROCESSING DEVICE AND IMAGE PROCESSING METHOD FOR GENERATING ELECTRONIC DOCUMENT WITH A TABLE LINE DETERMINATION PORTION

(75) Inventor: Makoto Enomoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 12/824,860

(22) Filed: Jun. 28, 2010

(65) Prior Publication Data

US 2011/0002547 A1    Jan. 6, 2011

(30) Foreign Application Priority Data

Jul. 1, 2009    (JP) .................................. 2009-156971

(51) Int. Cl.
*G06K 9/34* (2006.01)

(52) U.S. Cl.
USPC ........... 382/175; 382/173; 382/176; 382/181; 382/190; 382/203; 358/1.1; 358/1.13; 358/448; 358/462; 358/474; 358/537; 358/538

(58) Field of Classification Search ........................ None
See application file for complete search history.

(56) References Cited

U.S. PATENT DOCUMENTS

| 5,048,107 | A  | * | 9/1991  | Tachikawa ..................... 382/173 |
| 5,680,478 | A  |   | 10/1997 | Wang et al. ..................... 382/176 |
| 5,881,381 | A  | * | 3/1999  | Yamashita et al. ............. 715/209 |
| 5,907,631 | A  | * | 5/1999  | Saitoh ............................. 382/176 |
| 6,404,921 | B1 |   | 6/2002  | Ishida ............................. 382/197 |
| 7,164,795 | B2 | * | 1/2007  | Ohara et al. ................... 382/199 |
| 7,440,618 | B2 | * | 10/2008 | Ohara et al. ................... 382/193 |
| 7,623,710 | B2 | * | 11/2009 | Simard et al. ................. 382/175 |
| 7,860,266 | B2 | * | 12/2010 | Sekiguchi et al. ............. 382/100 |
| 7,873,218 | B2 | * | 1/2011  | Uzawa ........................... 382/199 |
| 2002/0021840 | A1 | * | 2/2002 | Ohara et al. ................... 382/199 |
| 2004/0223197 | A1 | * | 11/2004 | Ohta et al. ..................... 358/538 |
| 2005/0031208 | A1 | * | 2/2005 | Ohara et al. ................... 382/202 |
| 2005/0238244 | A1 |   | 10/2005 | Uzawa ........................... 382/242 |
| 2006/0215233 | A1 | * | 9/2006 | Hirai et al. ..................... 358/448 |
| 2009/0234820 | A1 | * | 9/2009 | Kaburagi et al. ................. 707/3 |
| 2009/0324080 | A1 |   | 12/2009 | Yamazaki et al. ............. 382/176 |

FOREIGN PATENT DOCUMENTS

| JP | 11-167532    | 6/1999  |
| JP | 3026592 B2   | 3/2000  |
| JP | 2004-086436  | 3/2004  |
| JP | 2005-028678 A| 2/2005  |
| JP | 2005-346137  | 12/2007 |
| KR | 10-2000-0047655 | 7/2000 |
| KR | 10-2005-0071843 | 7/2005 |

OTHER PUBLICATIONS

Aug. 7, 20012 Korean Office Action in Korean Application No. 10-2010-0063286.

* cited by examiner

*Primary Examiner* — Matthew Bella
*Assistant Examiner* — Jason Heidemann
(74) *Attorney, Agent, or Firm* — Fitzpatrick, Cella, Harper & Scinto

(57) ABSTRACT

There are provided an image processing device, an image processing method and a program that generate an electronic document in a format specification that is optimal for many purposes of electronic documents. A table region is discriminated from an input image, and a table structure in the table region is analyzed. A table line determination is made on the analyzed table structure as to whether or not each ruled line is representable in the format, and ruled line information and a vector line object are created according to the determination result. The created ruled line information and vector line object are used to generate the electronic document.

10 Claims, 16 Drawing Sheets

| CELL | ATTRIBUTE | | | |
|---|---|---|---|---|
| 1-1 | RECTANGLE | POSITION(100,200) | SIZE(200,70) | |
| | SIDE (UPPER, RIGHT, LOWER, LEFT) | LINE COLOR (#000, #000, #000, #000) | LINE TYPE (1(SOLID LINE),1,1,1) | |
| | CORNER (UPPER LEFT, UPPER RIGHT, LOWER RIGHT, LOWER LEFT) | CURVATURE (1/30,8,8,8) | | |
| 1-2 | RECTANGLE | POSITION(300,200) | SIZE(400,70) | |
| | SIDE (UPPER, RIGHT, LOWER, LEFT) | LINE COLOR (#000, #000, #000, #000) | LINE TYPE (1(SOLID LINE),1,1,1) | |
| | CORNER (UPPER LEFT, UPPER RIGHT, LOWER RIGHT, LOWER LEFT) | CURVATURE (8,1/30,8,8) | | |
| 2-1 | RECTANGLE | POSITION(100,270) | SIZE(200,70) | |
| | SIDE (UPPER, RIGHT, LOWER, LEFT) | LINE COLOR (#000, #000, #000, #000) | LINE TYPE (1(SOLID LINE),1,1,1) | |
| | CORNER (UPPER LEFT, UPPER RIGHT, LOWER RIGHT, LOWER LEFT) | CURVATURE (8,8,8,1/30) | | |
| 2-2 | RECTANGLE | POSITION(300,270) | SIZE(400,70) | |
| | SIDE (UPPER, RIGHT, LOWER, LEFT) | LINE COLOR (#000, #000, #000, #000) | LINE TYPE (1(SOLID LINE),1,1,1) | |
| | CORNER (UPPER LEFT, UPPER RIGHT, LOWER RIGHT, LOWER LEFT) | CURVATURE (8,8,1/30,8) | | |

FIG.7

| REGION | RECTANGLE-SIZE | RECOGNITION RESULT |
|---|---|---|
| 602 | (250,70)-(420,80) | "ApplicationForm" |
| 603 | (170,210)-(70,50) | "ID" |
| 604 | (400,210)-(200,50) | "1234567" |
| 605 | (150,280)-(100,50) | "Name" |
| 606 | (380,210)-(240,50) | "Maruko Taro" |

FIG.8

| SPECIFICATION NAME | WorkbookDocumentA |
|---|---|
| SPECIFICATION OF LINE COLOR | MONOCHROMATIC 32-BIT COLOR |
| SPECIFICATION OF LINE TYPE | SOLID LINE[1] BROKEN LINE1[2-1] BROKEN LINE2[1-1] BROKEN LINE3[2-1-1-1] |
| SPECIFICATION OF CORNER PORTION CURVATURE | 8(RADIUS OF CURVATURE 0) |

FIG.9

```
<Workbook>
 <Sheet>
  <Table>
   <Column c="1" width="100"/>
   <Column c="2" width="200"/>
   <Column c="3" width="400"/>
   <Row r="1" hight="200"/>
   <Row r="2" hight="70">
    <Cell c="2" type="string" value="ID">
     <Line position="right" type="solid" color="#000000"/>
     <Line position="bottom" type="solid" color="#000000"/>
    </Cell>
    <Cell c="3" type="string" value="1234567">
     <Line position="left" type="solid" color="#000000"/>
     <Line position="bottom" type="solid" color="#000000"/>
    </Cell>
   </Row>
   <Row r="3" hight="70">
    <Cell c="2" type="string" value="Name">
     <Line position="top" type="solid" color="#000000"/>
     <Line position="right" type="solid" color="#000000"/>
    </Cell>
    <Cell c="3" type="string" value="Maruko Taro">
     <Line position="top" type="solid" color="#000000"/>
     <Line position="left" type="solid" color="#000000"/>
    </Cell>
   </Row>
  </Table>
  <Shapes>
   <Shape fromCell="2 2" fromPos="0 0" toCell="3 3" toPos="0 0">
    <Path canvasSize="1530 560" data="M 1520 0 L 240 0 L 240 ····  "/>
   </Shape>
   <Shape fromCell ="2 3" fromPos="0 0" toCell ="3 4" toPos="0 0">
    <Path canvasSize="1530 560" data="M 0 0 L 1450 0 Q 1490 ····  "/>
   </Shape>
   <Shape fromCell ="3 2" fromPos="0 0" toCell ="4 3" toPos="0 0">
    <Path canvasSize="1530 560" data="M 0 0 L 0 270 C 0 320 ····  "/>
   </Shape>
   <Shape fromCell ="3 3" fromPos="0 0" toCell ="4 4" toPos="0 0">
    <Path canvasSize="1530 560" data="M 1520 0 L 1540 0 L 1520 ····  "/>
   </Shape>
   <Shape>
    <Text fontsize="15" data="ApplicationForm"/>
   </Shape>
  </Shapes>
 </Sheet>
</Workbook>
```

| | 1 | 2 | 3 | 4 | 5 | 6 | 7 | 8 | 9 |
|---|---|---|---|---|---|---|---|---|---|
| 1 | | ApplicationForm | | | | | | | |
| 2 | | ID | 1234567 | | | | | | |
| 3 | | Name | Marko Taro | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| 11 | | | | | | | | | |
| 12 | | | | | | | | | |

SHEET1

| SPECIFICATION NAME | WorkbookDocumentA |
|---|---|
| TABLE WITHIN CELL | NOT AVAILABLE |
| SPECIFICATION OF LINE COLOR | MONOCHROMATIC 32-BIT COLOR |
| SPECIFICATION OF LINE TYPE | SOLID LINE[1]<br>BROKEN LINE1[2-1]<br>BROKEN LINE2[1-1]<br>BROKEN LINE3[2-1-1-1] |
| SPECIFICATION OF CORNER PORTION CURVATURE | 8(RADIUS OF CURVATURE 0) |

FIG.14

FIG.16

IMAGE PROCESSING DEVICE AND IMAGE PROCESSING METHOD FOR GENERATING ELECTRONIC DOCUMENT WITH A TABLE LINE DETERMINATION PORTION

BACKGROUND OF THE INVENTION

1. Field of the Invention

The present invention relates to a method of storing results of document image processing.

2. Description of the Related Art

In recent years, networks such as the Internet are widely spread, and thus documents are often electronically distributed; however, paper on which an electronic document is printed is frequently distributed. Technologies have been considered that can acquire, even when a paper document is only available, the contents of the paper document from the paper as reusable data. For example, in Japanese Patent Laid-Open No. H11-167532 (1999), there is disclosed a technology in which a document image is transmitted from a terminal to a server, and in which the data of the document image recognized on the server is converted into a reusable format and is transmitted back to the terminal. Moreover, in Japanese Patent Laid-Open No. 2005-346137, there is disclosed a technology in which a document image is divided into regions corresponding to the type of object, and in which data can be individually output.

When a document image generated by scanning a paper document is converted into an electronic document, a data format which a user desires to reuse is different depending on the circumstances, but it is desirable for objects of the document image to be so arranged that the user easily utilizes the individual objects. For example, for a user who desires to edit and use, as a table, a table in a document image, it is desirable for the table to be so arranged on an electronic document that the table can be edited as a table object. For a user who desires to reprint a table and use the table as a paper document, it is desirable for the table to be arranged such that visual information such as table lines is reproduced according to the document image as accurately as possible. The table lines of the document image may however fail to be completely reproduced, depending on the specifications of the format of an electronic document, when a table on an image is converted into a table object. In order for the visual information of a table to be reproduced, the method disclosed in Japanese Patent Laid-Open No. 2005-346137 or the like can be used to draw the table as a vector object; however, in this way, it is impossible for the user to edit the table as a table, for example, it is impossible to add or remove a row. As described above, the specification of an optimal format is different depending on purposes in cases such as where the user desires to edit the table as a table and when the user desires to print or display a table to use it. Hence, it is difficult to generate an electronic document in a format specification that is optimal for many purposes of the electronic document.

SUMMARY OF THE INVENTION

According to the present invention, an image processing device that generates, from an input image, an electronic document having a predetermined format, the image processing device comprising: a region-discrimination unit configured to analyze the image and discriminate a table region; a table-structure-analysis unit configured to analyze a table structure and a ruled line in the discriminated-table region and create table-structure information including information on a cell of a table; a determination unit configured to determine whether or not a side of the cell included in the created table-structure information can be represented as a ruled line of the table according to the format; a unit configured to create information of a ruled line to be represented according to the format from the side of the cell which is determined to be representable as the ruled line; a unit configured to create a vector-line object by performing vector-conversion processing on the side of the cell which is determined to be unrepresentable as the ruled line; and an electronic-document-generation unit configured to generate the electronic document from the created table-structure information, the created ruled-line information, and the created vector-line object.

According to the present invention, there are provided an image processing device and an image processing method that generate an electronic document in a format specification that is optimal for many purposes of the electronic document.

Further features of the present invention will become apparent from the following description of exemplary embodiments with reference to the attached drawings.

BRIEF DESCRIPTION OF THE DRAWINGS

FIG. 7 is a diagram showing an example of the result of a table-structure-information analysis in the embodiment;

FIG. 8 is a diagram showing an example of the result of character recognition in a character region in the embodiment;

FIG. 9 is a diagram showing an example of the specification of a workbook document to be converted in the embodiment;

FIG. 10 is a diagram showing an example of the converted workbook document in the embodiment;

FIG. 11 is a diagram showing an example where the workbook document is displayed in a display/editing program in the embodiment;

FIG. 12 is a diagram showing an example where the workbook document is edited with the display/editing program in another embodiment;

FIG. 14 is a diagram showing an example of the specification of a workbook document to be converted in the another embodiment;

FIG. 16 is a diagram showing an example where the workbook document is displayed in a display/editing program in the another embodiment.

DESCRIPTION OF THE EMBODIMENTS

Preferred embodiments of the present invention will be described in detail below with reference to the accompanying drawings. The scope of the present invention is however not limited to these embodiments.

Embodiment 1

Figure 1:
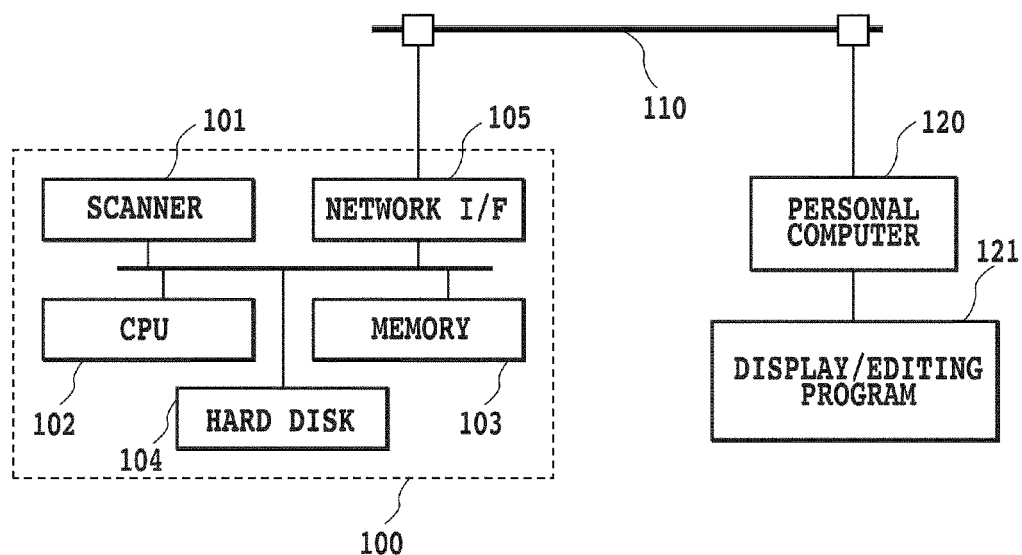
FIG. 1 is a diagram showing an example of the configuration of a system according to an embodiment of the present invention.

FIG. 1 is a diagram showing an example of the configuration of a system used in embodiment 1. Reference numeral 100 represents an example of the configuration of an image processing device embodying the present invention. The image processing device 100 includes a scanner 101, a CPU 102, a memory 103, a hard disk 104 and a network I/F 105. The scanner 101 is a reading device that coverts, into image data, information on the paper of a document which has been read. The CPU 102 is a processor that executes an electronic-document-generation program for performing processing of the present invention on the image data. The memory 103 is utilized to, for example, temporarily store work memory or data when a program read from the hard disk 104 or the like is executed. The hard disk 109 is a storage device that stores a program such as the electronic-document-generation program and data. The network I/F 105 is an interface for exchanging data with an external device. A personal computer (PC) 120 is a terminal device that is connected through a network such as a LAN 110 to the image processing device 100, and that receives data transmitted from the image processing device. The PC 120 can perform a display/editing program 121 that allows the received electronic document to be displayed and edited on a screen.

Figure 2:
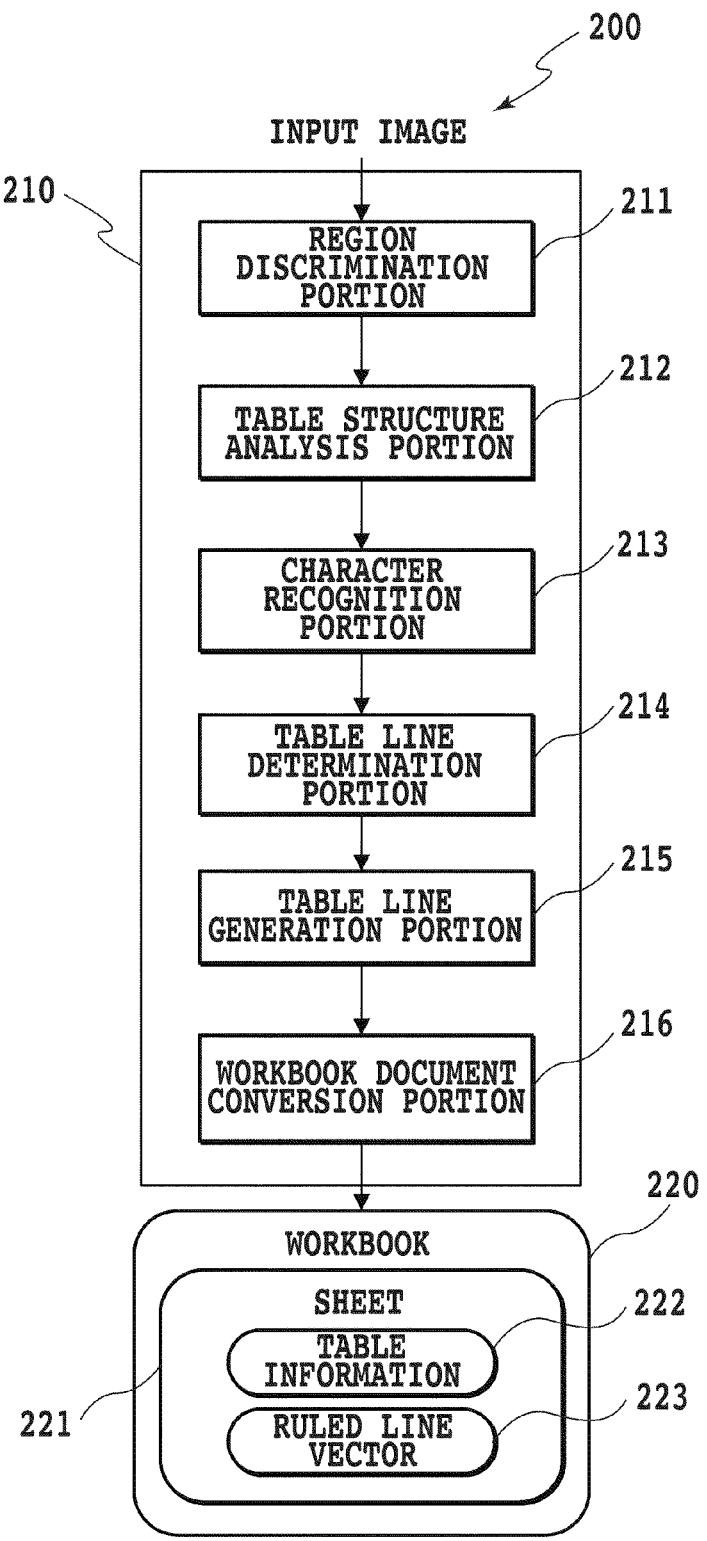
FIG. 2 is a diagram illustrating the operation of an image processing device in the embodiment.

FIG. 2 is a diagram showing the operation of the image processing device 100 in embodiment 1. Each type of processing shown in FIG. 2 is realized through the execution of the electronic-document-generation program by the CPU 102, but part or the whole of the processing may be realized by an electrical circuit.

Reference numeral 200 represents an input image input from the scanner 101. Reference numeral 210 represents an electronic-document-generation portion for generating an electronic document from the input image 200. A workbook document 220 is an electronic-document-generated by the electronic-document-generation portion 210. A predetermined format specification is defined for the workbook document 220. An example of the format specification will be described later. Note that a format of a workbook document in the embodiment is one of a spreadsheet available in a spreadsheet software (e.g., Microsoft Office Excel), but not limited to this.

Blocks 211 to 215 schematically represent the individual types of processing performed by the electronic-document-generation portion 210.

Reference numeral 211 represents a region-discrimination portion that analyzes a document image which has been input and that extracts regions such as for characters, tables and natural images. Reference numeral 212 represents a table-structure-analysis portion that analyzes a table structure and a ruled line on the table region extracted from the region-discrimination portion 211, and that creates table-structure information.

Figure 3:
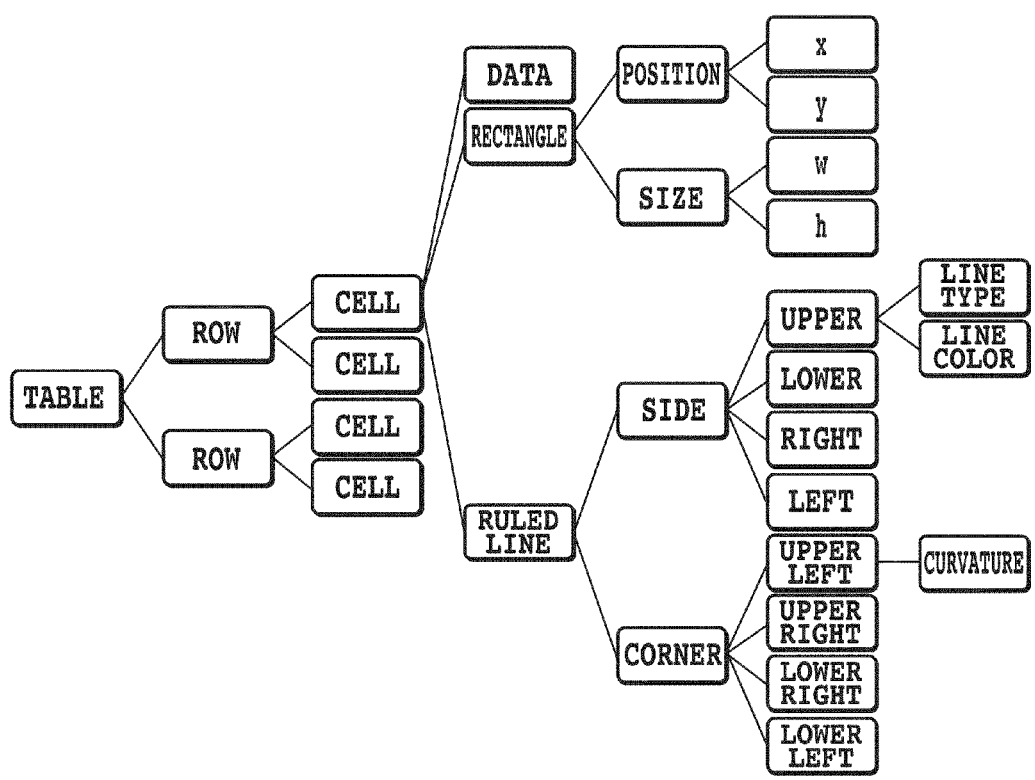
FIG. 3 is a diagram illustrating table structure information in the embodiment.

FIG. 3 is a diagram showing, in the form of a tree, the table-structure information obtained from the table-structure-analysis portion 212. In the table-structure information, a tree structure is formed with rows and the minimum constituent units of the table, namely, cells that are obtained through the division of the rows into columns. The cells have, as subelements, the information of data, rectangles and ruled lines. The data stores results obtained by recognizing characters within the cells. The rectangles are formed with positions x and y and sizes w and h, and store coordinates within the document of the cell. The ruled lines are the information of line borders enclosing the cells, and are formed with upper, lower, left and right sides; the sides have line-type information, which is line thickness and pattern information, and line-color information. Corners are each formed with upper left, upper right, lower right and lower left, and store the information of the curvature of the corners. The information-holding method shown in FIG. 3 is one example; the method of dividing the rows into the columns may be reversed, and the information of the table structure may be formed in any structure other than the tree structure.

Reference numeral 213 shown in FIG. 2 represents a character-recognition portion that performs character recognition on the character regions extracted from the table-structure-analysis portion 212. The results obtained by the recognition are stored in data within the cell element of the table-structure information. Reference numeral 214 represents a table-line-determination portion that checks the table lines against the format specification of the workbook document to be converted and that determines whether or not the table lines can be represented as the border lines of the cells.

Reference numeral 215 represents a table-line-generation portion that creates the ruled-line information of the table, and creates a vector-line object for the cell which is determined by the table-line-determination portion 214 such that it cannot be drawn as the border lines of the cells, and arranges the vector-line object in an appropriate position. Reference numeral 216 represents a workbook-document-conversion portion (electronic-document-generation portion) that converts the character-recognition data, the vector-line object, and the border line information of the cells into the format of the workbook document 220.

The workbook document 220 generated by the workbook-document-generation portion 210 has a sheet 221, and can be displayed and edited by the display/editing program 121 held by the PC 120. The sheet 221 is the data of a sheet that is the unit of pages within the workbook document, and includes table information 222 and ruled-line vector information 223.

An example of the table-line-determination portion 214 will be described below with reference to the flowchart of FIG. 4.

In step S401, a cell region that has not undergone the table-line-determination processing is selected from the cell elements of the table-structure tree extracted by the table-structure-analysis portion 212. In step S402, a vectorization flag for determining whether or not to vectorize the side elements of the cell is prepared, and is set to false. The information set in the vectorization flag is stored in a storage portion such as the memory 103 and the hard disk 104. The same is true for the information of results obtained by performing various types of processing described below. In step S403, repetition ends where repetition processing is performed on all {sides, adjacent sides} of the selected cell region, that is, {upper, right}, {right, lower}, {lower, left} and {left, upper} are shown. The adjacent side refers to a side that joins a side of interest in a clockwise direction. In step S404, a determination is made as to whether or not the curvature of the corner where the side and the adjacent side are joined together falls within the range of the format specification of the workbook document to be converted. If the curvature falls within the range, the process proceeds to step S405 whereas, if it falls outside the range, the process proceeds to step S408. In step S405, a determination is made as to whether or not the line color of the side falls within the range of the format specification of the workbook document to be converted. If the line color falls within the range, the process proceeds to step S406 whereas, if it falls outside the range, the process proceeds to step S409. In step S406, a determination is made as to whether or not the line type of the side falls within the range of the format specification of the workbook document to be converted. If the line type falls within the range, the process proceeds to step S407 whereas, if it falls outside the range, the process proceeds to step S409. Step S407 is the end of the repetition starting from step S403. If {side, adjacent side} is {left, upper}, the repetition is completed, and the process proceeds to step S410 whereas, if it is not, the process proceeds to step S403. In step S408, the vectorization flags of the side and the adjacent side are set to true, and the process proceeds to step S407. In step S409, the vectorization flag of the side is set to true, and the process proceeds to step S407. In step S410, a determination is made as to whether or not an unprocessed cell is left. If the unprocessed cell is not present, the process is completed whereas, if the unprocessed cell is present, the process proceeds to step S401.

With the processing described above and shown in FIG. 9, the table-line-determination portion 214 determines whether or not the curvature of the corner where the side and the adjacent side are joined together, the line color of the side and the line type of the side fall within the range of the format specification of the workbook document to be converted. If they are determined not to fall within the range of the format specification, that is, if the side is determined to be unrepresentable (not able to be represented) according to the format specification, the vectorization flag of the side is set to true. The method of determining whether or not the side can be represented is not limited to this method; the determination is made based on the attribute of the format specification.

An example of the processing performed by the table-line-generation portion 215 will be described below with reference to the flowchart of FIG. 5.

In step S501, a cell region that has not undergone the table-line-generation processing is selected from the cell information of the table-structure information extracted by the table-structure-analysis portion 212. In step S502, repetition ends where processing is repeatedly performed on the upper side, the right side, the lower side and the left side of one cell region. In step S503, a determination is made as to whether or not the ruled-line-generation processing has already been performed on the side of the selected cell region. If the ruled-line-generation processing has not been performed, the process proceeds to step S509 whereas, if the line-generation processing has been performed, the process proceeds to step S508. In step S504, a determination is made as to whether the vectorization flag added by the table-line-determination portion 214 is true or false. If the flag is true, the process proceeds to step S505 whereas, if the flag is false, the process proceeds to step S509. In step S505, processing for coupling the vectorization sides of the adjacent sides is performed. If the vectorization flags of the adjacent sides are true, the vectorization sides are coupled, and if the vectorization flags of the remaining parallel sides are true, further coupling is performed. If both the adjacent sides are false, the sides are not coupled together. In step S506, vectorization processing is performed on the vectorization sides coupled in step S505. In other words, vector-conversion processing is performed on a target-line region in the input document image to generate the vector-line object as table-line information. In step S507, the vector-line object created in step S506 is arranged on the cell. The cell is arranged in such a position that circumscribed-rectangle, upper-left-point coordinates and circumscribed-rectangle, lower-right-point coordinates of the vector-line object coincide with the relative position of the upper-left coordinates of the cell corresponding to the vector-line object and the relative position of the lower-right coordinates of the cell. In other words, the table-line information in which the vector-line object is arranged in the relative coordinates of the table region is created. Step S508 shows the end of the repetition starting from step S502. If the side is on the left (that is, if the processing is completed on all the upper side, the right side, the lower side and the left side of one cell region), the process proceeds to step S510 whereas, if the processing is not completed, the process proceeds to step S502. In step S509, the border-line information of the cell is set as the table-line information from the information of the curvature, the line type and the line color in the table-structure information, using the specification of the ruled lines of the cell of the document format to be converted. In step S510, a determination is made as to whether or not a cell that has not undergone the table-line-generation processing is present. If the unprocessed cell is present, the process proceeds to step S501 whereas, if the unprocessed cell is not present, the processing is completed.

With the processing described above and shown in FIG. 5, the adjacent sides whose vectorization flags are true are coupled and thus the vectorization processing is performed, and the table-line information in which the created vector-line object is arranged on the cell (that is, in the relative position of the table region) is created. On the side whose vectorization flag is false, the table-line information, in which the border-line information of the cell is set, is created using the specification of the ruled lines of the cell of the document format (the ruled lines representable in the format of the table in the document).

As an example of the input image 200, an example of processing in which the workbook-document-generation portion 210 converts an image 600 shown in FIG. 6 into the workbook document 220 of its own format will be described below.

The region-discrimination portion 211 first uses known image-analysis processing to extract the character region and the table region in the input image. One example of the region-discrimination processing is proposed in, for example, Japanese Patent Laid-Open No. 2004-086436. The specification of U.S. Pat. No. 5,680,478 discloses that a set of black pixels and white pixels in the document image is extracted, and that, based on the shape, the size, the state of the set and the like, characteristic regions such as for characters, pictures and drawings, tables, frames and lines are extracted. There is also a method of extracting primitive line information from an image using a run-length method or the like without the use of the region discrimination processing.

In the example of the image 600, it is assumed that a region 601 enclosed by dotted lines is extracted as the table region, and that regions 602, 603, 604, 605 and 606 are extracted as character regions.

Then, the table-structure-analysis portion 212 uses a known table-structure-analysis technology to extract information on rows within the table, the structure of columns, the line color and line type of ruled lines, the curvature of corner portions and the like. One example of the table structure analysis technology is proposed in, for example, Japanese Patent Laid-Open No. 2004-086436. The Japanese Patent Laid-Open No. 2004-086436 discloses that, based on histograms determined from each of edges in two directions, ruled-line information is acquired from the vicinity of the border of a mass of white pixels within a table region.

FIG. 7 is a diagram showing, in a table, an example of the information extracted by the table-structure-analysis portion 212. A cell of 1-1 represents a cell in the first row and the first column from the upper left corner. It is shown that, in a circumscribed rectangle of this cell, the upper left coordinates are (100, 200) (upper left origin, unit pixel), the size is (200, 70) (width, height, unit pixel). It is shown that, in the sides of this cell, the line color of all the sides is #000 (black) in 12-bit RGB and the line type of all the sides is 1. It is shown that, in the curvature of this cell, the curvature of the upper left corner portion is 1/30 (1/pixel), and that the curvature of the other corner portions is cc (the radius of curvature is zero.)

Here, the information of the line type is represented by the repetition of the display region of a ruled-line pattern and a pattern of the length with respect to the thickness of a non-display region. For example, when the line type is 1, it shows a solid line in the display region alone; when the line type is 1-1, it shows a broken line in which the display region and the non-display region of the same width as the thickness are repeated. The method of storing the pattern information of the line type is one example; the information may be stored by another method.

A cell in 1-2 represents a cell in the first row and the second column from the upper left corner. It represents the extraction of cell information in which the upper left coordinates of a circumscribed rectangle of the cell are (300, 200), the size is (900, 70), the line color of all the sides is #000 (black), the line type of all the sides is a solid line, and the curvature of the upper right corner portion is 1/30 and the curvature of the other corner portions is ∞ (the radius of curvature is zero).

A cell in 2-1 represents a cell in the second row and the first column from the upper left corner. It represents the extraction of cell information in which the upper left coordinates of a circumscribed rectangle of the cell are (100, 270), the size is (200, 70), the line color of all the sides is #000 (black), the line type of all the sides is a solid line, and the curvature of the lower left corner portion is 1/30 and the curvature of the other corner portions is ∞ (the radius of curvature is zero).

A cell in 2-2 represents a cell in the second row and the second column from the upper left corner. It represents the extraction of cell information in which the upper left coordinates of a circumscribed rectangle of the cell are (300, 270), the size is (400, 70), the line color of all the sides is #000 (black), the line type of all the sides is a solid line, and the curvature of the lower right corner portion is 1/30 and the curvature of the other corner portions is ∞ (the radius of curvature is zero).

The character recognition portion 213 uses a known character-recognition technology to recognize characters within each character region, and generates character-code data and OCR display data along with the sizes of characters. An example of the character-recognition processing will be briefly described. This description is simply one example; another method may be used.

In the character-recognition processing, a determination is first made as to whether writing is performed horizontally or vertically in the character region, that is, as to the direction of the rows. One way to do this is to binarize an image, acquire projections in vertical and horizontal directions and determine which one of the projections is low in projection diffusion is in the row direction. Then, the image is divided into individual character images. The image is preferably divided into the character images by performing the following operations: the line space to be cut is found by using the projection of the binary image in the row direction; thus the image is divided into row images; furthermore the character space of the row image to be cut is found by using the row and the projection in the vertical direction. Then, the feature of each of the character images is obtained, feature information closest to the feature is searched from a dictionary that previously stores features of all types of characters and a character code indicated by the dictionary is obtained as the result of the recognition. The size of the character can be obtained as the average value of the sizes of the characters acquired when the individual characters are recognized; another method may be used.

Figure 6:
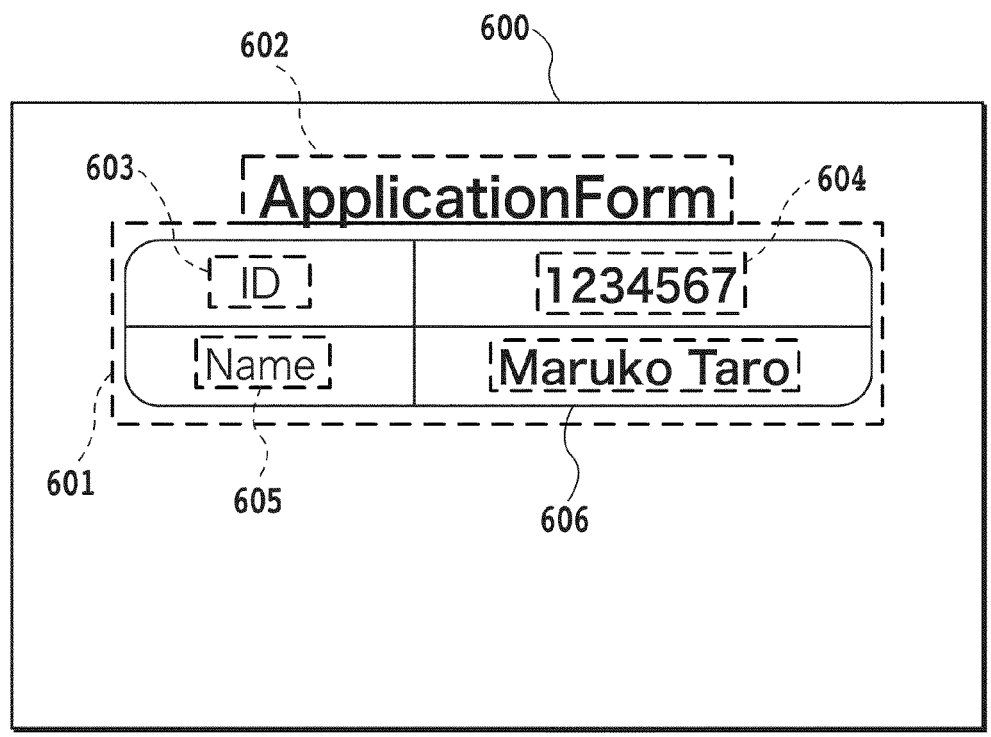
FIG. 6 is a diagram showing an example of an input image in the embodiment.

FIG. 8 is a diagram showing, in a table, an example of the results of the processing performed by the region-discrimination portion 211 and the character-recognition portion 213 in the example of FIG. 6. In this example, character strings "ApplicationForm", "ID", "1234567", "name" and "Maruko Taro" are extracted from regions 602, 603, 604, 605 and 606, respectively, as the recognition results of the character-recognition portion.

Since the region 603 is within the cell of 1-1 shown in FIG. 7, the region 603 is stored as the data of the cell of 1-1. Since the region 604 is within the cell of 1-2, the region 604 is stored as the data of the cell of 1-2. Since the region 605 is within the cell of 2-1, the region 605 is stored as the data of the cell of 2-1. Since the region 606 is within the cell of 2-2, the region 606 is stored as the data of the cell of 2-2.

The processing of the table-line determination portion 214 will be described with reference to the flowchart of FIG. 4.

In step S401, the cell of 1-1 is selected as a cell that has not undergone the ruled-line determination. In step S402, a vectorization flag is defined as the information of the upper side, the lower side, the left side and the right side of the 1-1 cell, and false information is set for each of them. In step S403, a value of the upper side is substituted into the variable of the side, a value of the right side is substituted into the variable of the adjacent side, and thus the repetition processing is started.

In step S404, a determination is made as to whether or not the curvature of the upper right corner portion, which is the corner between the upper side and the adjacent right side, falls within the range of the specification. The specification of the workbook document to be converted will be described using FIG. 9. It is assumed that the workbook document to be converted in this case is workbook document A which is the workbook document of its own XML format, that the specification of the line color is a monochromatic 32-bit color, that the specification of the line type is a solid line and a three pattern broken line and that the curvature of the corner portion is ∞. Since, in the upper right corner portion of the 1-1 cell, its curvature is ∞, that is, it falls within the range of the specification, the process proceeds to step S405.

In step S405, a determination is made as to whether or not the line color of the side falls with the range of the specification of the line color. Since the line color is an RGB 12-bit monochrome and can be converted into an RGB 32-bit monochrome, that is, it falls within the range of the specification, the process proceeds to step S406. In step S406, a determination is made as to whether or not the line type of the side falls within the range of the specification of the line type. Since the line type is 1 (solid line), that is, it falls within the specification, the process proceeds to step S407.

In step S407, since the repetition processing is not completed, the process proceeds to step S403. In step S403, the right side is substituted into the side, and the lower side is substituted into the adjacent side, and the process proceeds to step S404. Likewise, {side, adjacent side} falls within the range of the specification with respect to {right, lower} and {lower, left}, and the vectorization flag remains false. Finally, {left, upper} is substituted into {side, adjacent side}, and the process proceeds to step S404. In step S404, since the curvature of the upper left corner portion, which is the corner between the upper side and the adjacent left side, is 1/30, that is, it falls outside the range of the specification, the process proceeds to step S408. In step S408, the vectorization flag of the left side and the upper side, which are the side and the adjacent side currently considered, is set true, and the process proceeds to step S407. In step S407, it is determined that the repetition processing is completed, and the process proceeds to step S410. In step S410, the cells of 1-2, 2-1 and 2-2 are unprocessed, and thus the process proceeds to step S401.

When the same processing is performed on the cells of 1-2, 2-1 and 2-2, the vectorization flag of the upper side and the right side is set true in the cell of 1-2, the vectorization flag of the lower side and the left side is set true in the cell of 2-1 and the vectorization flag of the right side and the lower side is set true in the cell of 2-2. In step S410, the vectorization-determination processing is completed on all the cells, and thus the processing is completed.

The processing of the table-line-generation portion 215 will be described with reference to the flowchart of FIG. 5. In step S501, the cell of 1-1 is selected as an unprocessed cell. In step S502, the upper side is substituted into the variable of the side, and the repetition processing is started. In step S503, the upper side is the side of the unprocessed vector, and thus the process proceeds to step S504. In step S504, the upper side of the cell of 1-1 is determined to be true from the vectorization flag stored by the table-line-determination portion 214, and thus the process proceeds to step S505. In step S505, since the vectorization flag of the left side is true, the left side is coupled, and the vectorization is determined to be performed.

In step S506, the vector-line object is created, on the target side coupled in step S505, from the input image, by using a known vectorization technology. An example of the vectorization technology, there are methods disclosed in Japanese Patent No. 3026592 and Japanese Patent Laid-Open No. 2005-346137. For example, in the Japanese Patent No. 3026592, there is disclosed a technology that generates, by performing the followings, information in which the rounds of coupled pixel data called an outline vector are described by a set of vectors between pixels. While an image is raster scanned, the vectors between pixels in the horizontal direction and the vertical direction are detected based on the states of a pixel of interest and its adjacent pixel; and then the outline of image data is extracted based on the connection state of these vectors between pixels. In Japanese Patent Laid-Open No. 2005-346137, there is disclosed a technology that generates, even if significant scaling occurs, a high-quality vector-described data by approximating the outline vector with a linear, secondary or cubic Bezier curve.

In step S507, in the vector line object created in step S506, the vector-line-object, circumscribed-rectangle, upper-left-end coordinates are determined as the relative coordinates of a cell at the upper left end. Vector-line-object, circumscribed-rectangle, lower-left-end coordinates are determined as the relative coordinates of a cell at the lower right end (or the upper left end of a lower right cell). An arrangement coordinate value of the vector-line object is determined. In step S508, conditions for completing the repetition processing are not satisfied, and thus the process proceeds to step S502. In step S502, the value of the side is substituted into the right side. In step S503, since the right side is not vectorized yet, the process proceeds to step S504. In step S504, the vectorization flag of the side is false, and thus the process proceeds to step S509. In step S509, conversion from information on the corner portion curvature of ∞, the solid line and #000 of the table structure information into the line-border format of the cell of the workbook document to be converted is performed.

In step S508, the conditions for completing the repetition processing are not satisfied, and thus the process proceeds to step S502. In step S502, the lower side is substituted into the side, and the processing is repeated. As with the right side, the lower side is converted into the border-line format of the cell.

Finally, the value of the side is substituted into the left side, and the process proceeds to step S503. In step S503, since the left side is coupled with the upper side, and the vectorization is completed when the upper side is processed, the process proceeds to step S508. In step S508, the repetition processing is completed, and thus the process proceeds to step S510. In step S510, the cells of 1-2, 2-1 and 2-2 are unprocessed, and thus the process proceeds to step S501.

Likewise, the processing is performed, from step S501, on 1-2, 2-1 and 2-2, and thus, on the cell of 1-2, the upper side and the right side are coupled with each other and are converted into the vector-line object, and the lower side and the left side are converted into the cell-line-border format. On the cell of 2-1, the lower side and the left side are coupled with each other and are converted into the vector-line object, and the upper side and the right side are converted into the cell-line-border format. On the cell of 2-2, the right side and the lower side are coupled with each other and are converted into the vector-line object, and the upper side and the left side are converted into the cell-line-border format. In step S510, no unprocessed cell is present, and thus the processing is completed.

Based on the table structure information created by the table-structure-analysis portion 212, the characters recognized by the character-recognition portion 213 and the ruled-line information of the table created by the table-line-generation portion 215, the workbook-document-conversion portion 216 performs conversion into an electronic document in the workbook-document format.

An electronic document 1000 of FIG. 10 is an example of the workbook document 220 generated according to the specification of an imaginary XML format made for describing the present example.

A code 1001 is a portion that stores table information, and corresponds to an area covered by an element name "Table". In the code 1001, a "Column" element portion 1003 describing the information of the columns of the table and a "Row" element portion 1004 describing the information of the rows are stored. The sheet of the workbook document is generated from one large piece of table information.

In the example of the input image of FIG. 6, the number of rows and columns within the image is 2×2 but one row and one column are added to express margins in the upper part and left part of the table, thus forming 3×3. Hence, three "Column" elements 1003 indicating the columns and three "Row" element portions 1004 indicating the rows are present. The "Column" element 1003 stores a column number "c" attribute and each column width "width" attribute.

In the "Column" element 1003, as indicated in the rectangle information of the cell of FIG. 7, since the width of the table left part is 100 (in other words, the x coordinate of the position of the cell 1-1 is 100), the width of the "Column" element of the "Column" element 1003 when c=1 is 100. Since the width of the size of the cell in the first table column of FIG. 7 is 200, the width of the "Column" element of the "Column" element 1003 when c=2 is 200. Since the width of the size of the cell in the second table column of FIG. 7 is 400, the width of the "Column" element of the "Column" element 1003 when c=3 is 400.

In the "Row" element, a row number "r" attribute and each row height "height" attribute are stored; the "Row" element is composed of cell information "Cell" elements corresponding in number to the columns.

In the "Row" element portion 1004, as indicated in the rectangle information of the cell of FIG. 7, since the height of the table upper part is 200 (in other words, the y coordinate of the position of the cell 1-1 is 200), the height "height" of the "Row" element when r=1 is 200. Since the height in the first table row is 70, the height "height" of the "Row" element when r=2 is 70. Since the height in the second table row is 70, the height "height" of the "Row" element when r=3 is 70.

Since the "Row" element when r=1 is a margin and no cell information is present, no subelement "Cell" element is present. Since, in each of the "Row" element when r=2 and the "Row" element when r=3, two pieces of cell information are present, the two "Cell" elements are held.

The "Cell" element stores a "c" attribute indicating that the "Cell" element itself is the c-th column, a "type" attribute indicating the type of data described in the cell and a "value" attribute indicating the value of data in the cell; the "Cell" element is formed with border-line information "Line" of the cell. Here, according to the results of the character recognition shown in FIG. 8, the "Cell" element of c=2 within the "Row" element of r=2 stores type="string" and value="ID". The "Cell" element of c=3 stores type="string" and value="1234567". The "Cell" element of c=2 within the "Row" element of r=3 stores type="string" and value="Name". The "Cell" element of c=3 stores type="string" and value="Maruko Taro".

A "Line" element stores a "position" attribute indicating which one of the four sides the element corresponds to, a "type" attribute indicating the line type and a "color" attribute indicating the line color.

Figure 5:
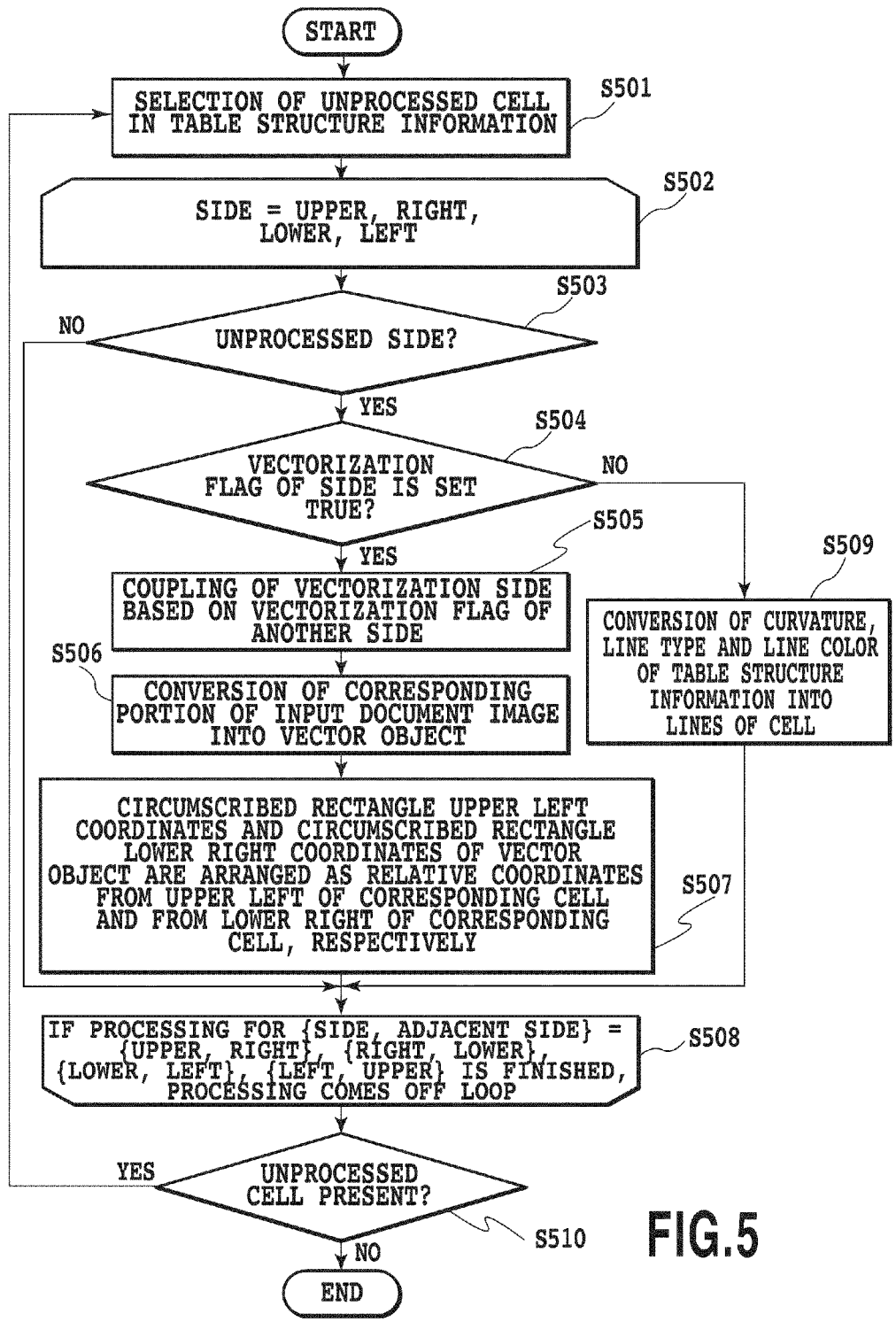
FIG. 5 is a flowchart showing table-line-generation processing in the embodiment.

According to the border-line information of the cell created in the flowchart of FIG. 5, two "Line" elements whose positions are the right and the bottom are set for the "Cell" of c=2 within the "Row" of r=2. Individually, in the "type" attribute, solid indicating the solid line is stored, and, in the color attribute, #000000 indicating black is stored.

Two "Line" elements whose positions are the left and the bottom are set for the "Cell" of c=3 within the "Row" of r=2. Individually, in the "type" attribute, solid indicating the solid line is stored, and, in the color attribute, #000000 indicating black is stored.

Two "Line" elements whose positions are the right and the top are set for the "Cell" of c=2 within the "Row" of r=3. Individually, in the "type" attribute, solid indicating the solid line is stored, and, in the color attribute, #000000 indicating black is stored.

Two "Line" elements whose positions are the left and the top are set for the "Cell" of c=3 within the "Row" of r=3. Individually, in the "type" attribute, solid indicating the solid line is stored, and, in the color attribute, #000000 indicating black is stored.

A code 1002 is freely arranged on the table, and is a portion in which graphic information is stored and corresponds to an area enclosed by an element name "Shape". The code 1002 is composed of a plurality of "Shape" elements describing the graphic information.

The "Shape" element has a graphic object as a subelement, and stores, as an attribute, information on a position where the graphic object is drawn. Here, the "Shape" element corresponds to one vector-line object. In the code 1002, four "Shape" elements 1005, 1006, 1007 and 1008 formed with subelements "Path" representing Bezier curve are included. In the present invention, the vector-line object defines the upper left end and the lower right end as the relative coordinates of the cell. Hence, the "Shape" element is composed of information of fromCell representing the matrix of the target cell relative to the upper left end, information of fromPos representing the relative coordinates, information of toCell representing the matrix of the target cell relative to the lower right end and information of toPos representing the relative coordinates.

The "Shape" element 1005, which is the vector-line object on the upper left side of the cell 1-1, will be specifically described. In the "Shape" element 1005, with respect to the cell in the second row and the second column (fromCell="2 2"), a position where a drawing is made in an area ranging from the upper left end (0,0) (fromPos="0 0") to the lower right end and size information are described. The lower right end in the second row and the second column corresponds to the upper left end (0,0) (toPos="0 0") in the third row and the third column (toCell="3 3").

Likewise, the "Shape" element 1006, which is the vector-line object on the upper right side of the cell 1-2, is as follows. Specifically, with respect to the cell in the second row and the third column (fromCell="2 3"), a position where a drawing is made in an area ranging from the upper left end (0,0) (fromPos="0 0") to the lower right end and size information are described. The lower right end in the second row and the third column corresponds to the upper left end (0,0) (toPos="0 0") in the third row and the fourth column (toCell="3 4").

The "Shape" element 1007, which is the vector-line object on the lower left side of the cell 2-1, is as follows. Specifically, with respect to the cell in the third row and the second column (fromCell="3 2"), a position where a drawing is made in an area ranging from the upper left end (0,0) (fromPos="0 0") to the lower right end and size information are described. The lower right end in the third row and the second column corresponds to the upper left end (0,0) (toPos="0 0") in the fourth row and the third column (toCell="3 4").

The "Shape" element 1008, which is the vector-line object on the lower right side of the cell 2-2, is as follows. Specifically, with respect to the cell in the third row and the third column (fromCell="3 3"), a position where a drawing is made in an area ranging from the upper left end (0,0) (fropPos="0 0") to the lower right end and size information are described. The lower right end in the third row and the third column corresponds to the upper left end (0,0) (toPos="0 0") in the fourth row and the fourth column (toCell="4 4").

The "Path" element has information on the shape of an object, and describes, on a plane whose size is set in a "canvasSize" attribute, the shape of a curve in the "data" attribute with the cubic Bezier curve.

A window 1101 is a window displayed by the display/editing program 121, and includes a sheet editing window 1102.

In the sheet-editing window 1102, a display corresponding to the contents of the sheet information 221 in the workbook document 220 is generated. For the electronic document 1000 in FIG. 10 illustrated in embodiment 1 of the present invention, the contents of table information 1001 and ruled-line data 1002 are drawn. For a table with a corner portion having curvature that cannot be represented by the border lines of the cell, the table is generated as its input image is.

In the sheet-editing window 1102, the user can add a row of the table, change the contents of the cell and change the size of the cell. Moreover, the user can store the workbook document that has been edited, and print the appearance of the displayed sheet editing window 1102 on paper.

Figure 12:
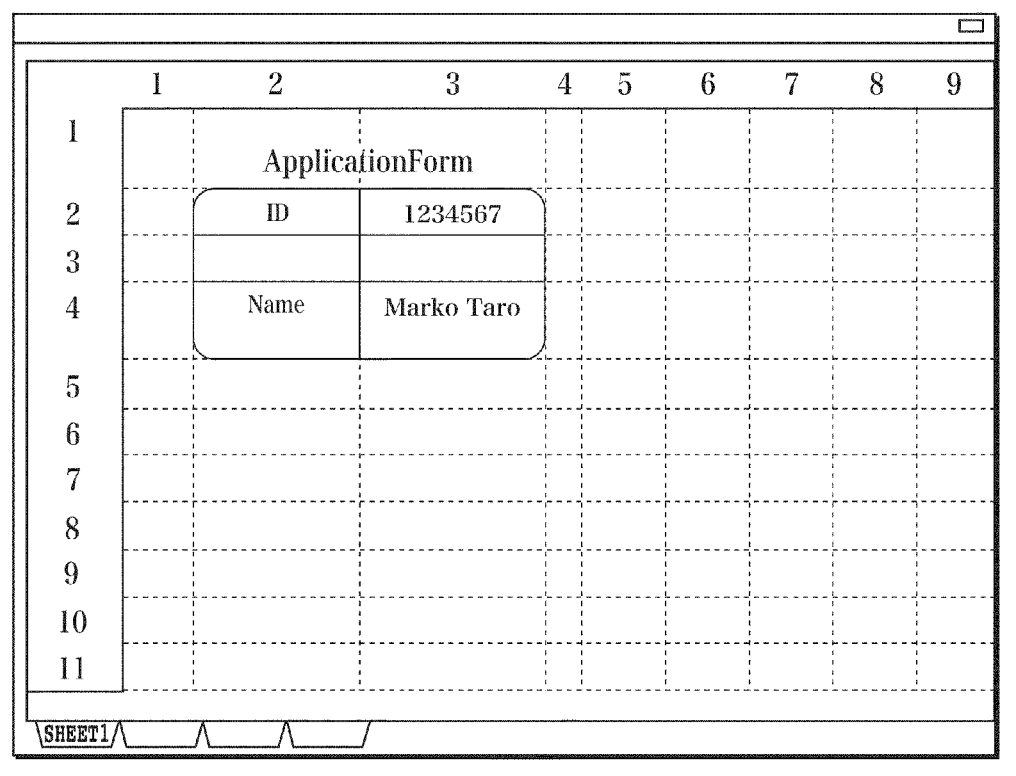

FIG. 12 shows an example of the result obtained through the addition of a row and the change of a cell size by the user. Since the vector-line object is described as the coordinates relative to the cell, even if an operation such as for changing the size of the cell and inserting a row is performed, the vector-line object follows like the border line of the cell.

As described above, in the present example, the workbook is generated that represents the ruled lines which cannot be reproduced by the specification of the format and that can be edited as a table.

The workbook thus generated can be easily selected through a menu or the like and used by the user with the display/editing program 121. Specifically, according to the present embodiment, it is possible to provide a workbook in a format suitable for either of the purpose of printing or displaying the workbook on a display and the purpose of editing a table of the workbook or for both purposes.

Embodiment 2

Although embodiment 1 deals with the case where the ruled lines which cannot be represented simply by the specification are switched, ruled lines which cannot be represented due to a complicated structure itself may additionally be switched.

Figure 13:
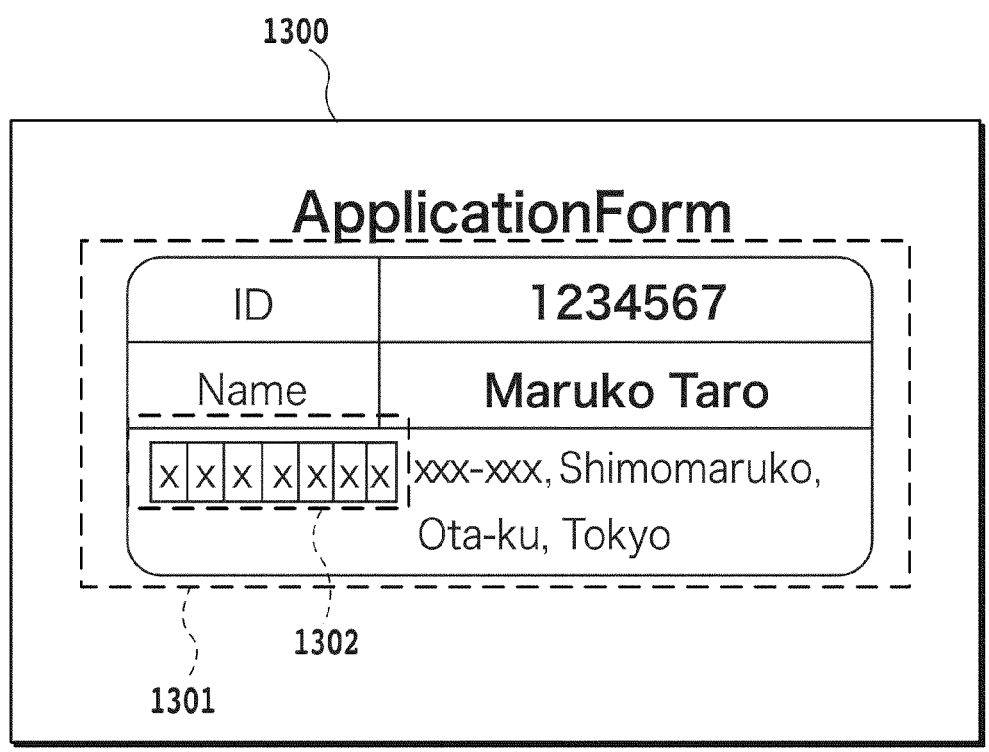
FIG. 13 is a diagram showing an example of an input image in the another embodiment.

Processing in an example where an image 1300 of FIG. 13 is an input image and a table of FIG. 14 is the specification of a converted format will be described below.

For example, when the image 1300 is processed by the region-discrimination portion 211, regions 1301 and 1302 are assumed to be extracted as table regions.

The same processing as in embodiment 1 is performed on the regions 1301 and 1302 by the table-structure-analysis portion 212, and thus table-structure information is extracted, and a result obtained by recognizing characters in a character region is extracted by the character-recognition portion 213.

Figure 15:
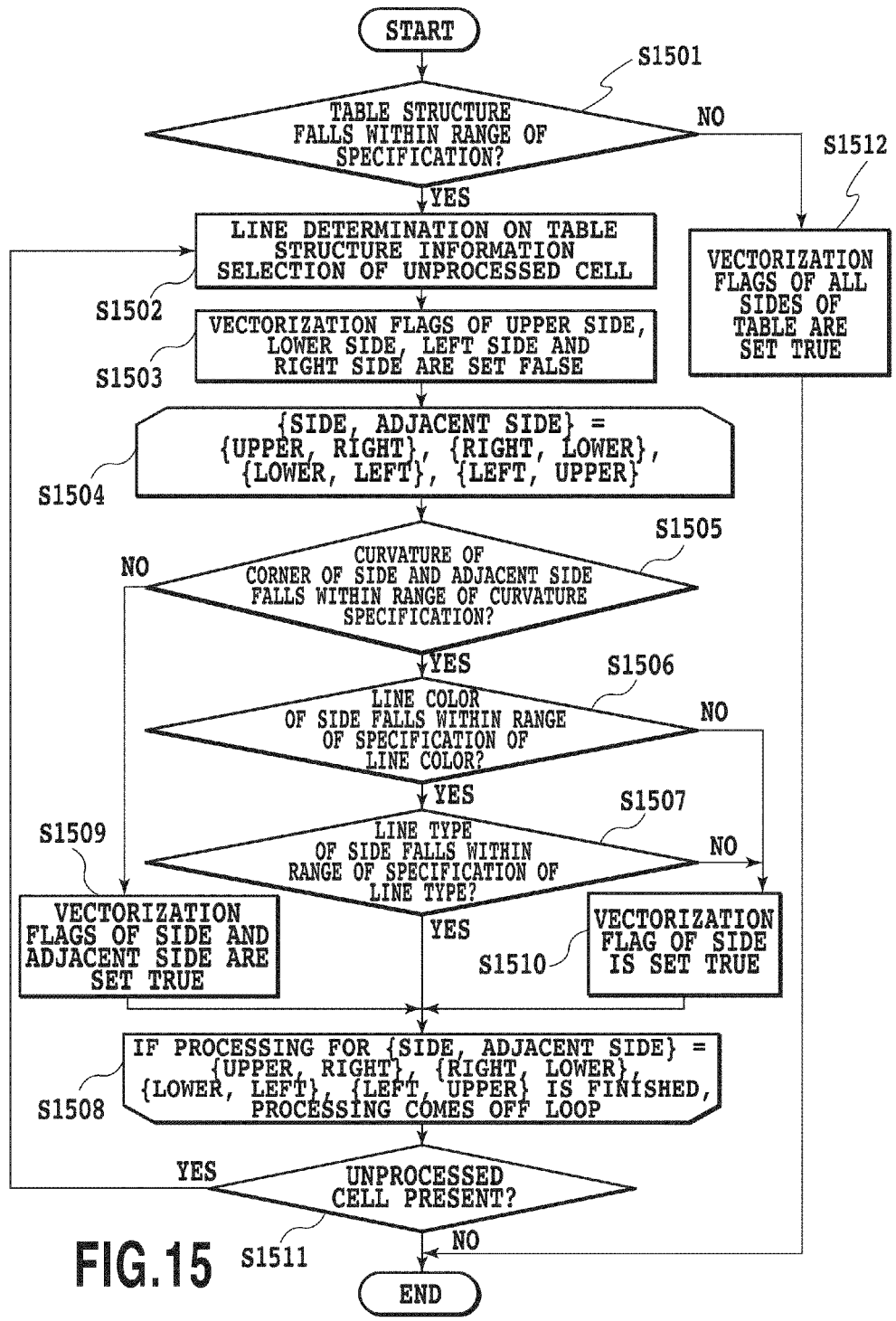
FIG. 15 is a flowchart showing table-line-determination processing in the another embodiment.

An example of processing performed by the table-line-determination portion 214 will be described with reference to the flowchart of FIG. 15.

Figure 4:
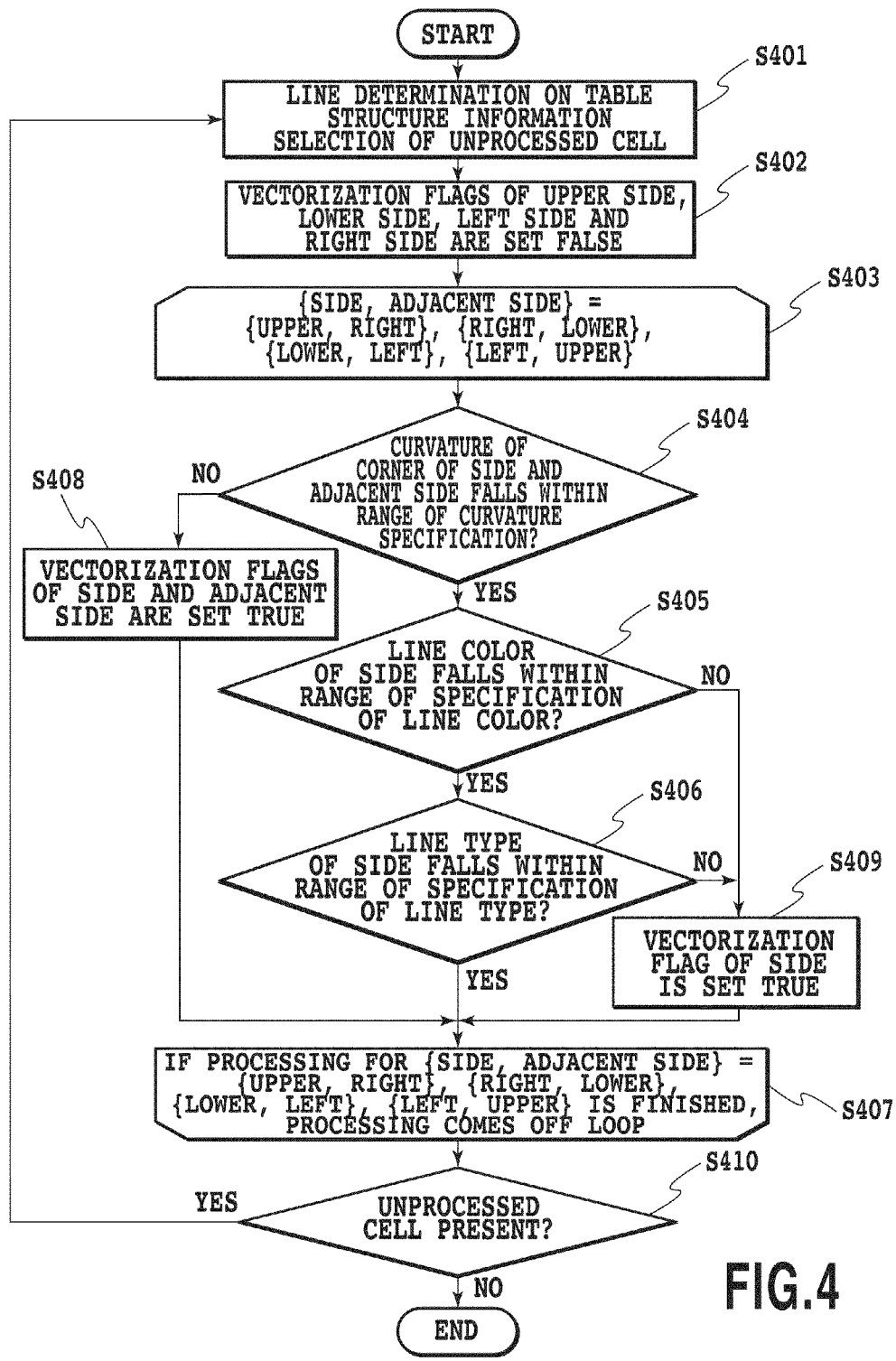
FIG. 4 is a flowchart showing table-line-determination processing in the embodiment.

In this embodiment 2, since the number of criteria for the specification of ruled lines is increased, processing for determining the specification of a table structure itself in step S1501 is added to the flowchart of the table-line determination in embodiment 1 shown in FIG. 4.

In step S1501, a determination is made as to whether or not the range of the specification on the position of the table itself is satisfied. In this embodiment, if the target table of the determination exists inside of another table, the determination is made as the specification on the position of the table itself being unsatisfied. On the other hand, if the target table of the determination does not exist inside of another table, the determination is made as the specification on the position of the table itself being satisfied. With respect to the region 1301, the specification on the position of the table is satisfied, and thus the process proceeds to step S1502. Thereafter, the same processing as in embodiment 1 is performed, and the vectorization flags of the left and upper sides of the cell in the first row and the first column are set true, the vectorization flags of the right and upper sides of the cell in the first row and the second column are set true and the vectorization flags of the left, bottom and right sides of the cell in the third row and the first column are set true.

With respect to the table region 1302, the position of the table is within the cell of table region 1301, and thus the process proceeds to step S1512. In step S1512, the vectorization flags of all the sides of the table structure are set true, and an internal character string is also represented as a text within a graphic object.

Based on the determination result of the table-line-determination portion 214, the table-line-generation portion 215 generates table lines. With respect to the region 1301, the upper left side of the cell in the first row and the first column is converted into a vector-line object, the upper right side of the cell in the first row and the second column is converted into a vector-line object and the right bottom and left bottom sides of the cell in the third row and the first column are converted into a vector-line objects. With respect to the region 1302, all the sides are converted into vector-line objects.

Based on the results of the character-recognition portion 213 and the table-line-generation portion 215, the workbook-document-conversion portion 216 performs processing for converting the character-recognition data, the vector-line objects and the border-line information of the cells into the workbook document.

Figure 16:
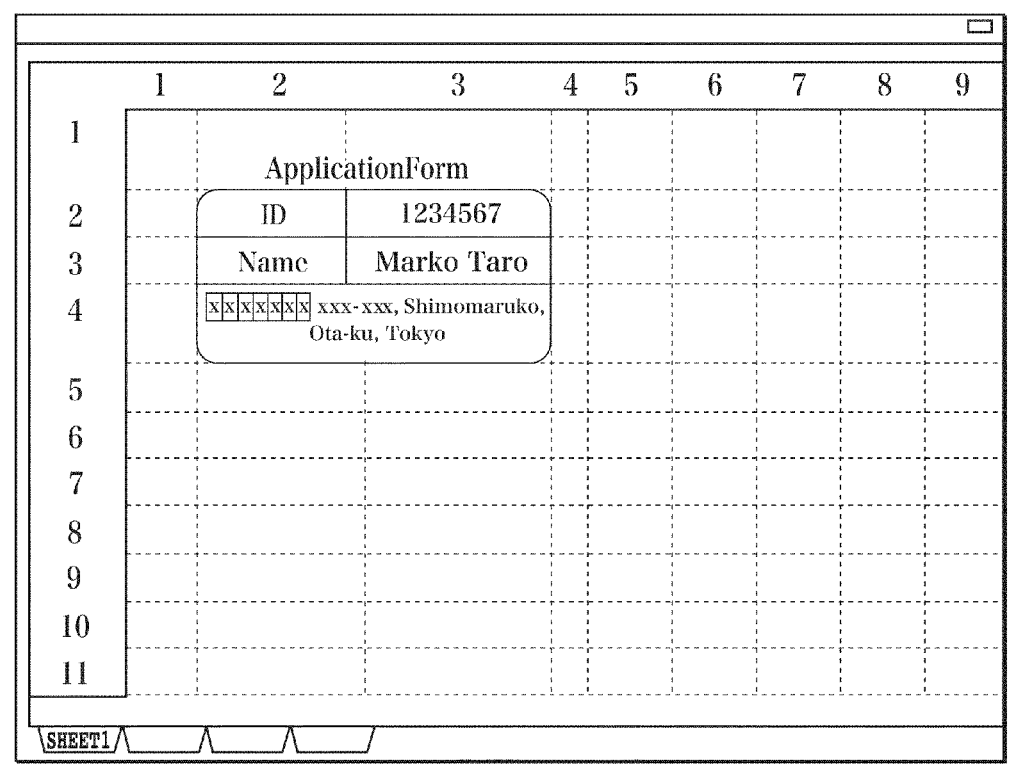

FIG. 16 is an example where the workbook document obtained by converting the image 1300 is opened by the display/editing program 121. As shown in FIG. 16, it is possible to reproduce the region 1302 that cannot be represented by the conventional specification.

According to the present embodiment, even if the structure itself of a table is complicated, it is possible to provide a workbook in a format suitable for either of the purpose of printing or displaying the workbook on a display and the purpose of editing the table of the workbook or for both purposes.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-156971, filed Jul. 1, 2009, which is hereby incorporated by reference herein in its entirety.

What is claimed is:

1. An image processing device that generates, from an input image, an electronic document having a predetermined format, the image processing device comprising:
   a region-discrimination unit configured to analyze the input image and discriminate a table region;
   a table-structure-analysis unit configured to analyze a table structure and a ruled line in the discriminated table region and generate table-structure information including information on a cell of a table in the table region;
   a determination unit configured to determine whether or not a side of the cell included in the generated table-structure information can be represented as a ruled line of the table according to the predetermined format;
   a unit configured to generate information of a ruled line to be represented according to the predetermined format from the side which is determined to be representable as the ruled line;
   a unit configured to generate a vector-line object by performing vector-conversion processing on the side which is determined to be unrepresentable as the ruled line; and
   an electronic-document-generation unit configured to generate the electronic document from the generated tablestructure-information, the generated ruled-line information and the generated vector-line object.

2. The image processing device of claim 1, wherein the determination unit determines whether or not a side of the cell included in the generated table-structure information can be represented as a ruled line of the table according to the predetermined format based on the curvature of a corner where the side and an adjacent side thereof are joined together.

3. The image processing device of claim 1, wherein the determination unit determines whether or not a side of the cell included in the generated table-structure information can be represented as a ruled line of the table according to the predetermined format based on a line color of the side.

4. The image processing device of claim 1, wherein the determination unit determines whether or not a side of the cell included in the generated table-structure information can be represented as a ruled line of the table according to the predetermined format based on a line type of the side.

5. The image processing device of claim 1, wherein the determination unit determines whether or not a side of the cell included in the generated table-structure information can be represented as a ruled line of the table according to the predetermined format based on a position of the table included in the generated table-structure information.

6. The image processing device of claim 1, wherein the electronic-document-generation unit generates the electronic document in which the generated vector-line object is arranged in the cell according to the table-structure information.

7. The image processing device of claim 1, further comprising:
   a, wherein
   the region-discrimination unit is configured to analyze the input image and discriminate a character region,
   the character-recognition unit recognizes a character from the discriminated character region, and
   the electronic-document-generation unit generates the electronic document from the generated table-structure information, the generated ruled-line information, the generated vector-line object and the recognized character.

8. The image processing device of claim 1, wherein the format of the electronic document is a format of a spreadsheet.

9. An image processing method of generating, from an input image, an electronic document having a predetermined format, the method comprising:

a region-discrimination step of analyzing the input image and discriminating a table region;

a table-structure-analysis step of analyzing a table structure and a ruled line in the discriminated table region and generating table-structure information including information on a cell of a table in the table region;

a determination step of determining whether or not a side of the cell included in the generated table-structure information can be represented as a ruled line of the table according to the predetermined format;

a step of generating information of a ruled line to be represented according to the predetermined format from the side which is determined to be representable as the ruled line;

a step of generating a vector-line object by performing vector-conversion processing on the side which is determined to be unrepresentable as the ruled line; and an electronic-document-generation step of generating the electronic document from the generated table-structure information, the generated ruled-line information and the generated vector-line object.

10. A non-transitory computer-readable medium having computer-executable instructions for performing a method, the method generating, from an input image, an electronic document having a predetermined format, the method comprising:

a region-discrimination step of analyzing the input image and discriminating a table region;

a table-structure-analysis step of analyzing a table structure and a ruled line in the discriminated table region and generating table-structure information including information on a cell of a table in the table region;

a determination step of determining whether or not a side of the cell included in the generated table-structure information can be represented as a ruled line of the table according to the predetermined format;

a step of generating information of a ruled line to be represented according to the predetermined format from the side which is determined to be representable as the ruled line;

a step of generating a vector-line object by performing vector-conversion processing on the side which is determined to be unrepresentable as the ruled line; and an electronic-document-generation step of generating the electronic document from the generated table-structure information, the generated ruled-line information and the generated vector-line object.

* * * * *